United States Patent
Bowen et al.

(10) Patent No.: US 6,682,299 B2
(45) Date of Patent: Jan. 27, 2004

(54) VARIABLE STATOR VANE SUPPORT ARRANGEMENT

(75) Inventors: Wayne Ray Bowen, West Chester, OH (US); Jeffrey Clayton Potter, Holland, MI (US); Mitchell Jay Headley, Lebanon, OH (US)

(73) Assignee: General Electric Company, Schenectady, NY (US)

(*) Notice: Subject to any disclaimer, the term of this patent is extended or adjusted under 35 U.S.C. 154(b) by 94 days.

(21) Appl. No.: 09/999,275

(22) Filed: Nov. 15, 2001

(65) Prior Publication Data

US 2003/0170115 A1 Sep. 11, 2003

(51) Int. Cl.[7] .............................................. F01D 17/16
(52) U.S. Cl. ...................... 415/160; 415/229; 384/273
(58) Field of Search ................................. 415/156, 159, 415/160, 162, 209.3, 229, 230, 231; 384/273

(56) References Cited

U.S. PATENT DOCUMENTS

| | | | | |
|---|---|---|---|---|
| 2,362,566 A | * | 11/1944 | Lappert ................... 384/273 X |
| 3,079,128 A | | 2/1963 | Burge .......................... 415/191 |
| 3,303,992 A | | 2/1967 | Johnson .................... 415/149.4 |
| 3,367,628 A | | 2/1968 | Fitton .......................... 415/110 |
| 3,376,018 A | | 4/1968 | Williamson .............. 415/149.4 |
| 3,829,184 A | * | 8/1974 | Chevret ..................... 384/280 |
| 3,929,392 A | * | 12/1975 | Ogino ......................... 384/215 |
| 3,966,276 A | * | 6/1976 | Bellarbre et al. ........... 384/215 |
| 4,245,954 A | * | 1/1981 | Glenn ................. 415/209.3 X |
| 4,292,802 A | | 10/1981 | Snow ........................... 60/204 |
| 4,514,141 A | | 4/1985 | Marey ......................... 415/160 |
| 4,990,056 A | | 2/1991 | McClain et al. ............. 415/160 |
| 5,236,080 A | * | 8/1993 | Baum et al. ............. 384/273 X |
| 5,324,165 A | * | 6/1994 | Charbonnel et al. ......... 415/160 |
| 5,421,703 A | * | 6/1995 | Payling ............... 415/209.3 X |
| 5,601,370 A | * | 2/1997 | Shibayama et al. ......... 384/215 |
| 5,609,421 A | * | 3/1997 | Schulze-Eyssing et al. ...................... 384/273 X |
| 6,086,327 A | * | 7/2000 | Mack et al. ................. 415/160 |

FOREIGN PATENT DOCUMENTS

WO        WO 9415107 A1 *   7/1994   ........... F16C/33/08

* cited by examiner

Primary Examiner—Edward K. Look
Assistant Examiner—Richard A. Edgar
(74) Attorney, Agent, or Firm—Nathan D. Herkamp; Alfred J. Mangels

(57) ABSTRACT

A trunnion support for a variable-position stator vane in a turbomachine. The stator vane includes an upper trunnion and a lower trunnion to allow the stator vane to be pivoted about a longitudinal axis. The lower trunnion is supported in a bushing that is carried in an opening provided in an annular stator vane carrier ring. The bushing is longitudinally split and is installed in the carrier ring while in a laterally compressed condition so that when installed in the carrier ring the bushing bears against the carrier ring opening in which it is positioned. When the carrier ring material expands with rising temperature, the pre-stress in the bushing will cause it to expand to maintain tight frictional engagement between the bushing and the opening and thereby prevent relative rotation between the bushing and the carrier ring to minimize wear of the carrier ring material.

19 Claims, 3 Drawing Sheets

VARIABLE STATOR VANE SUPPORT ARRANGEMENT

BACKGROUND OF THE INVENTION

The present invention relates to turbomachines having stator vanes that are pivotable about a longitudinal axis of the vane to enable efficient operation of the turbomachine over a range of operating conditions. More particularly, the present invention relates to a support structure for pivotably supporting variable turbomachine stator vanes to reduce the wear between the vane trunnion and the support structure that engages the trunnion.

Modern day turbomachines incorporate variable geometry elements to improve the operating efficiency of the machine at conditions that are different from the design point applicable to a fixed geometry machine. For example, gas turbine engines having axial-flow compressors incorporate variable geometry elements such as variable inlet guide vanes and variable stator vanes. The variable vanes have trunnions at their upper and lower extremities and are arranged to be pivotable about a longitudinal axis, to enable their angle of attack relative to an incoming air stream to be changed in accordance with a predetermined schedule. Because of repetitive pivotal movements of the variable stator vanes over time, wear can occur at the contact areas between the vane trunnions and the stationary support structure that supports the vane trunnions for pivotal movement. Oftentimes the vane trunnions are carried in metallic bushings for reduced wear.

In aircraft gas turbine engines, where weight considerations are very important, in many instances lighter weight aluminum alloy materials are utilized for variable stator vane support structures, where appropriate, to minimize weight. In some engines, the variable stator vanes are supported in aluminum alloy support rings, which generally have a higher coefficient of thermal expansion than do the harder materials from which the vanes and the vane trunnions are formed, as well as those metallic materials sometimes utilized in vane trunnion bushings.

When a gas turbine engine warms up from a cold start to normal operating temperature, the temperature rise within the compressor can be as much as about 700° F., depending upon the compressor stage at which the temperature change is measured. As a result, the greater thermal expansion of the aluminum alloy trunnion support structure results in a radial gap between the trunnion support bushing and the surrounding structure, which allows the trunnion support bushing, which can have a lower coefficient of thermal expansion, to pivot relative to the trunnion support structure. Such relative movement can result in wear of the softer aluminum alloy support structure material and, if the wear is sufficiently large, it can allow movement of the stator vane into the annular space swept by an adjacent upstream or downstream rotor, resulting in contact between the stator vane and the rotor or rotor blades and possible damage to either or both the rotor blades or the stator vanes.

Sometimes composite materials are utilized for the trunnion bushing support structures in an effort to provide a material that has a lower coefficient of friction. Although composite materials, such as polyimide-based synthetics, can be utilized, their wear characteristics may be such that more frequent replacement of such composite bushings is required.

The present invention is directed to minimizing wear between the trunnion bushing and the trunnion support structure.

SUMMARY OF THE INVENTION

Briefly stated, in accordance with one aspect of the present invention, a stator vane support structure is provided for supporting a turbomachine stator vane for pivotal movement about a stator vane pivot axis. The support structure includes a carrier member for supporting a trunnion that extends from a longitudinal end of a stator vane. The carrier member is formed from a material having a first coefficient of thermal expansion, and it includes openings for receiving stator vane trunnion bushings. A substantially cylindrical bushing is carried in the opening in the carrier member and is formed from a material that has a second coefficient of thermal expansion that is less than the first coefficient of thermal expansion. The bushing includes a tubular body wall within which the trunnion is received for relative rotation therewith. The tubular body wall includes a gap to allow the outer diameter of the bushing to be decreased by the application of a laterally applied compressive force. The tubular body will in a relaxed condition have an initial outer diameter that is larger than the diameter of the opening in the carrier member. Thus, upon lateral compression of the bushing to a smaller outer diameter than its initial outer diameter it can be inserted into the opening in the carrier member and can be retained therein by an interference fit upon release of the compressive force.

BRIEF DESCRIPTION OF THE DRAWINGS

The structure, operation, and advantages of the present invention will become further apparent upon consideration of the following description, taken in conjunction with the accompanying drawings in which.

DETAILED DESCRIPTION OF THE INVENTION

Figure 1:
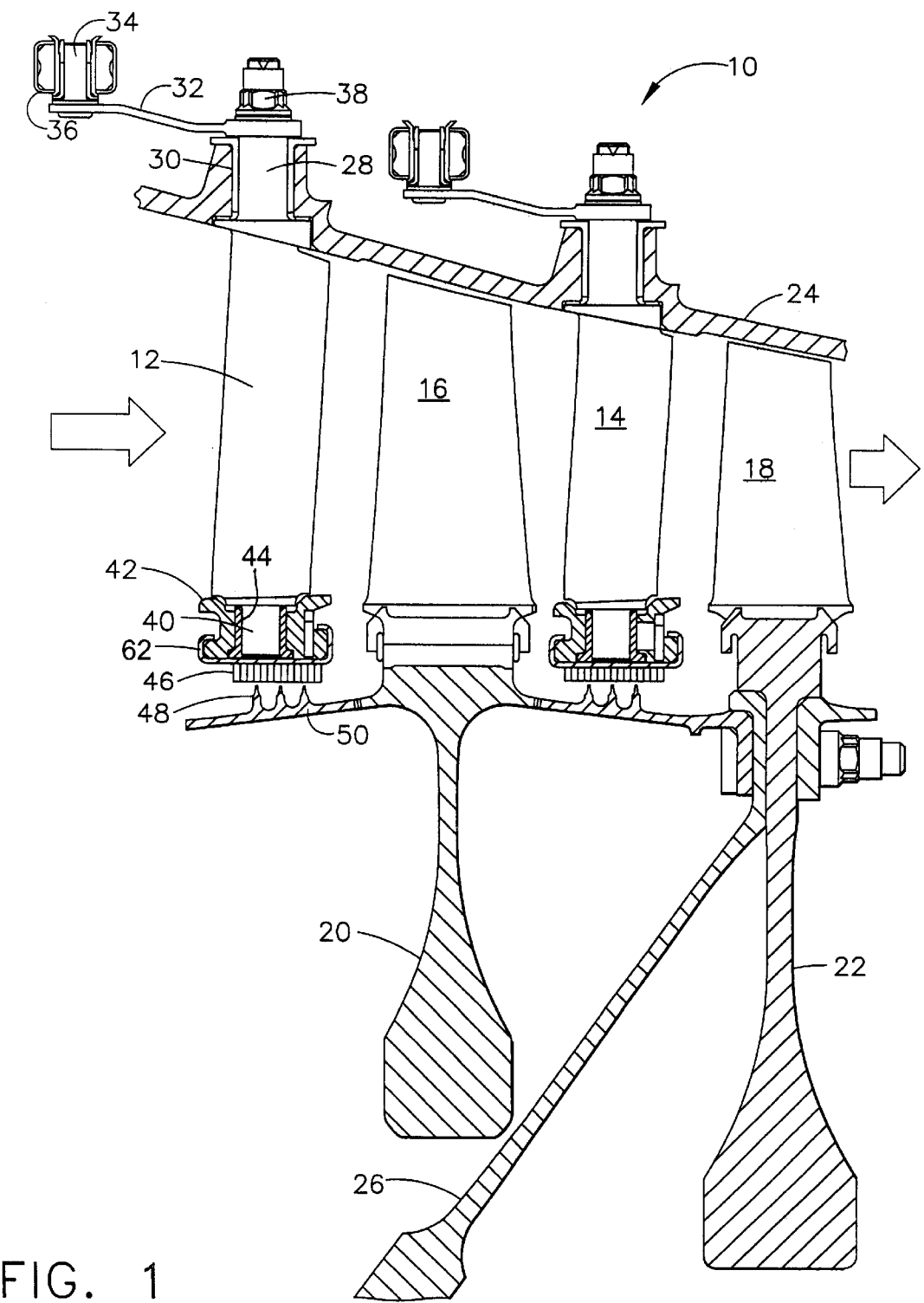
FIG. 1 is a fragmentary, longitudinal cross-sectional view of two adjacent stages of a multi-stage, axial-flow compressor.

Referring now to the drawings, and particularly to FIG. 1 thereof, there is shown in enlarged detail a portion of an axial-flow compressor 10. Two successive compressor stages are shown, each of which includes a plurality of circumferentially-spaced, generally radially-extending stator vanes 12, 14, respectively, only one of each of which is shown. Also forming part of each compressor stage are a plurality of circumferentially-spaced, generally radially-extending rotor blades 16, 18, respectively, only one of each of which is shown, and which are carried by respective rotor disks 20, 22. An annular outer casing 24 surrounds and encloses each of the compressor stages to define the outer periphery of an annular flow path through the compressor. Rotor disks 20, 22 are each drivingly connected with a frusto-conical drive shaft that is operatively connected with a high pressure turbine (not shown), which supplies the torque for rotating the compressor rotor.

Stator vane 12, to which vane 14 is similar and to which the following description also applies, has a longitudinal axis that extends in a radial direction relative to the engine axis. Vane 12 is pivotally supported so that it can be pivoted about a longitudinal axis in order to be angularly adjustable, relative to an incoming air stream, to respond to changing engine operating conditions, and thereby to maintain compressor operating efficiency at a high level, as well as to prevent undesirable surging of the air flow within the compressor. Vane 12 includes an upper trunnion 28 that extends into and is pivotally received in an opening in compressor outer casing 24, and that is supported in an upper trunnion bushing 30. In that regard, trunnion bushing 30 is formed from a relatively hard, steel-based alloy for improved wear resistance.

Connected to upper trunnion 28 is an actuating lever 32 that extends transversely relative to the stator vane longitudinal axis and that terminates in a trunnion 34 that is pivotally received in an annular actuation ring 36. Actuating lever 32 is non-rotatably secured to upper trunnion 28 by means of a connecting nut 38 that engages with a threaded outer end of trunnion 28. The actuation ring is movable in a circumferential direction, relative to the compressor longitudinal axis, by a suitable actuator (not shown), which serves to simultaneously pivot each of the stator vanes of a given compressor stage through the same pivot angle.

At its innermost longitudinal end stator vane 12 includes a lower trunnion 40 that is rotatably received in an annular support ring 42. Carried on the innermost radial surface of support ring 42 is an inner seal 46, typically formed from an abradable material, such as a steel honeycomb material, that is engaged by a rotating labyrinth seal 48 carried by the underlying rotor element 50 to provide an interstage seal to minimize leakage flow between adjacent stages of the compressor.

Figure 2:
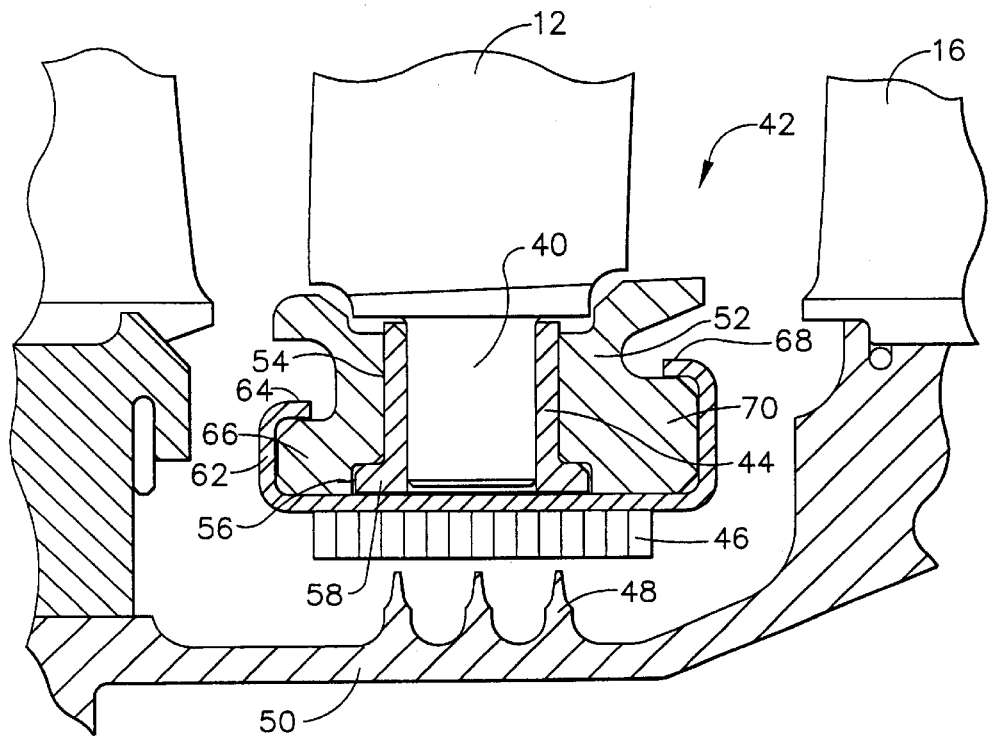
FIG. 2 is an enlarged, fragmentary, cross-sectional view at an inner radial end of a stator vane of the compressor shown in FIG. 1.

The lower pivotal connection of stator vane 12 with support ring 42 is shown in enlarged detail in FIG. 2. Support ring 42 includes an annular carrier ring 52 that for weight reduction purposes can be formed from an aluminum alloy material. In that regard, typical aluminum alloy carrier ring materials have a coefficient of thermal expansion that can range from about $10 \times 10^{-6}$ in/in/° F. to about $14 \times 10^{-6}$ in/in/° F.

Figure 3:
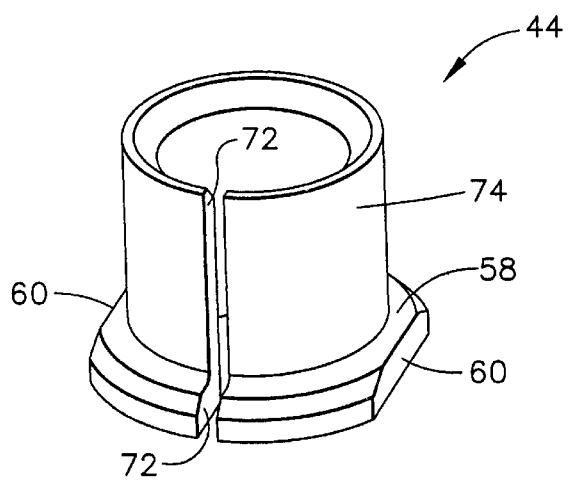
FIG. 3 is a perspective view of one form of split bushing for receiving a stator vane trunnion.

Carrier ring 52 has a plurality of circumferentially-spaced, radially-extending openings 54 within each of which a lower trunnion bushing 44 is received. At the innermost peripheral surface of carrier ring 52 there is provided an annular recess 56 that has an axial width that is larger than the diameter of openings 54 to receive an end flange 58 carried by respective bushings 44. In that regard, bushing end flange 58 can optionally include a single, flat end surface, or a pair of diametrically opposed, substantially parallel flat end surfaces 60 as shown in FIG. 3 to engage a surface of annular recess and thereby prevent rotation of bushings 44 relative to carrier ring 52. If two such flat surfaces as shown in FIG. 3 are provided they can be parallel with each other and can have a spacing that corresponds with the axial width of annular recess 56 of carrier ring 52, so that when bushing 44 is inserted into carrier ring 52 flat surfaces 60 of bushing flange 58 are in contact with the radial surfaces that define the width of annular recess 56, to prevent relative rotation between bushing 44 and carrier ring 52.

Each of bushings 44 is held in position within carrier ring 52 and is restrained from falling radially inwardly toward the compressor axis of rotation by an annular retaining ring 62. As shown, retaining ring 62 has a substantially C-shaped cross section and includes an upstream annular lip 64 that extends over and engages with an upstream axial flange 66 carried by carrier ring 52. Similarly, the downstream end of retaining ring 62 includes a downstream annular lip 68 that extends over and engages with a downstream axial flange 70 carried by carrier ring 52.

Because the aluminum alloy material from which carrier ring 52 is formed is substantially softer than the material from which trunnion 40 is formed, trunnion bushing 44 is made from a relatively hard material, such as steel to minimize wear that can occur when trunnion 40 pivots within bushing 44. In addition to being a softer material, carrier ring 52 also has a coefficient of thermal expansion that is considerably higher than that of either of trunnion 40 or trunnion bushing 44. During engine operation, and depending upon the compressor stage, carrier ring 52, trunnion bushing 44 and the surrounding structures can each experience a temperature change of as much as about 700° F., and because of the different coefficients of thermal expansion of the aluminum alloy material from which carrier ring 52 is made and the steel material from which bushing 44 is made, the carrier ring undergoes greater thermal expansion than does the bushing. As a result, a gap is formed between the outer cylindrical surface of bushing 44 and the inner cylindrical surface of opening 54, and also between the radially-extending walls of annular recess 56 and flat surfaces 60 of bushing 44. The gap results in looseness between bushing 44 and carrier ring 52, allowing some rotational movement of bushing 44 relative to carrier ring 52 when the stator vane is pivoted in response to changing engine operating conditions. Over time, such relative rotational movement can lead to increased wear of the inner cylindrical surfaces of openings 54, that further enlarges the gap between opening 54 and bushing 44, possibly allowing sufficient forward or rearward axial movement of the stator vane, relative to the compressor axis, to cause undesirable contact of the leading or trailing edge of the stator vane with rotor blades carried by one of the rotor disks on either side of it.

To eliminate the wear caused by the disparity in thermally-induced expansion between opening 54 in carrier ring 52 and lower trunnion bushing 44, the bushing can have a configuration as shown in FIG. 3. As there shown, bushing 44 includes a longitudinally-extending gap in the form of a slot 72 that extends through the wall of bushing cylindrical sleeve 74, and also extends across the bushing end flange 58. Slot 72, which can be of the order of from about 0.020 inches (about 0.5 mm) to about 0.10 inches (about 2.5 mm), allows bushing sleeve 74 to be laterally compressed to a smaller outer diameter when it is subjected to a laterally-applied compression force. In that regard, the outer diameter of bushing sleeve in its unstressed or uncompressed state is at least about 2% larger than the diameter of opening 54 in carrier ring 52.

Opening 54 has a diameter that is slightly larger than the outer diameter of the laterally compressed bushing. Accordingly, when the laterally-compressed bushing is installed within opening 54 and the compressive force is released, bushing sleeve 74 tends to expand diametrically. That diametral expansion tendency causes the outer surface of bushing sleeve 74 to tightly contact and to press against the inner surface of opening 54, to prevent relative rotation between bushing 44 and carrier ring 52. Consequently, bushing sleeve 74 is maintained under a compressive hoop stress throughout the compressor stage operating temperature range to cause sleeve 74 to continuously press radially outwardly against the inner surface of opening 54.

As the temperature in the region of carrier ring 52 increases and the diameter of opening 54 increases, the compressive radial pre-stress imposed upon bushing sleeve 74 causes the outer diameter of sleeve 74 to increase along with the increasing diameter of opening 54, to maintain tight contact therebetween. Thus, when carrier ring 52 and the adjacent elements of the structure reach their normal operating temperature the outer surface of bushing sleeve 74 will remain in contact with the inner surface of opening 54 to prevent rotation of bushing 44 within and relative to carrier ring 52, and therefore prevent the enlargement of opening 54 that would otherwise exist as a result of wear caused by rotation of bushing 44 relative to carrier ring 52. Moreover, although the inner diameter of bushing 44 will increase, thereby resulting in some lateral play between lower trunnion 40 and bushing 44, the greater surface hardness of those elements is such as to minimize the degree of wear that would cause an increase in the inner diameter of bushing sleeve 74 corresponding with that that would otherwise occur in opening 54 without a prestressed bushing, and therefore the stator vane will not move significantly in an axial direction of the compressor to an extent that could cause interference between the stator vane and the axially adjacent rotor blades.

In order to maintain engagement between the outer surface of the bushing and the passageway surface over the operating temperature range of the compressor stage, the degree of lateral compression of the bushing should be such that when the parts reach their normal operating temperature the radial expansion of bushing sleeve 74 corresponds with that of opening 54 to maintain continuous frictional engagement therebetween at a level to prevent relative rotation. Accordingly, the outer diameter of bushing sleeve 74 and the circumferential width of the longitudinal slot 72 in bushing 44 are selected based upon the initial diameter of opening 54 and the maximum diametral expansion that opening 54 is expected to undergo as a result of thermal expansion. Thus, when bushing 44 is properly sized and is properly pre-stressed, the compressive-stress-induced hoop stress within bushing sleeve 74 allows sleeve 44 to expand to at least correspond with the thermally-induced diametral expansion of opening 54. Consequently, when normal operating temperatures within the compressor are reached there still remains sufficient normal force between the outer surface of bushing sleeve 74 and the inner surface of opening 54 to maintain tight frictional engagement therebetween, to prevent relative rotation therebetween and the wear and enlargement of opening 54 that such relative rotation causes.

Figure 4:
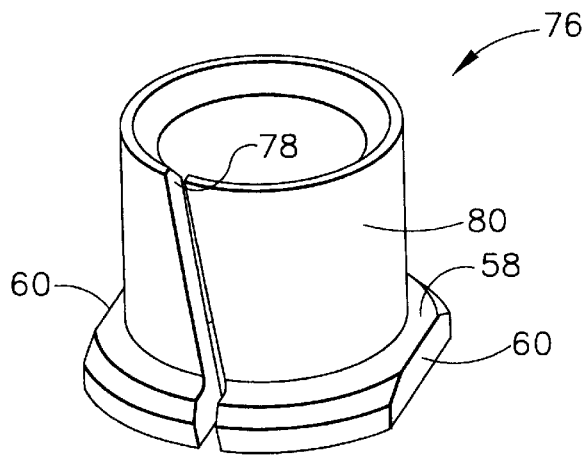
FIG. 4 is a perspective view of another form of split bushing for receiving a stator vane trunnion.

Although described above and although illustrated in FIG. 3 as a longitudinally-extending slot 72, the slot can extend other than axially relative to the bushing longitudinal axis. FIG. 4 shows a bushing 76 having a generally helically-extending slot 78 in bushing sleeve 80, one that extends at an angle relative to the bushing longitudinal axis.

Figure 5:
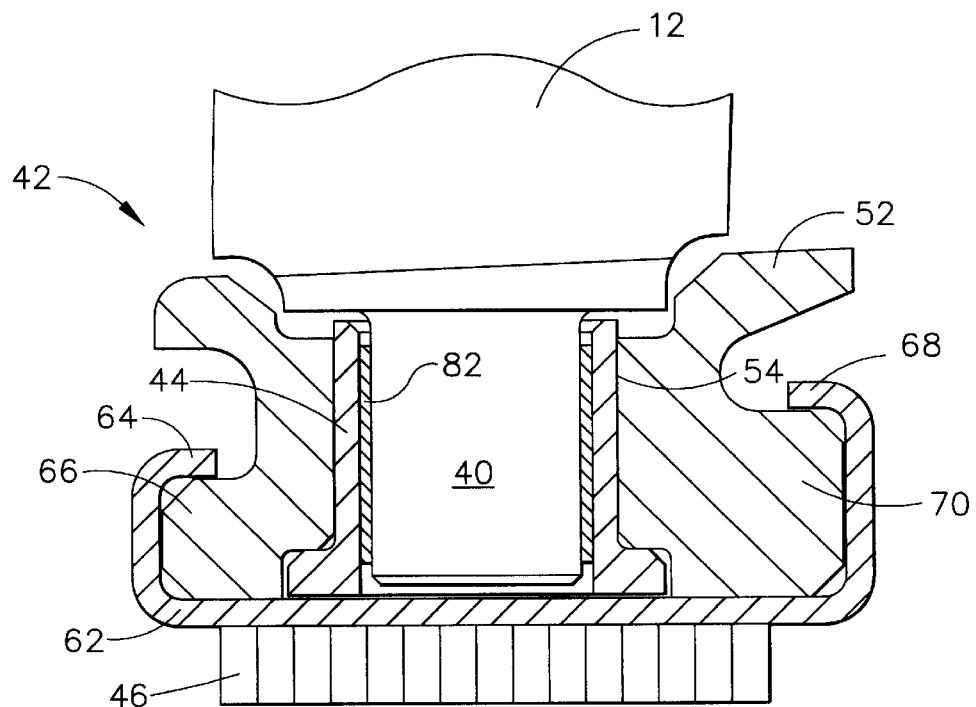
FIG. 5 is an enlarged, fragmentary, cross-sectional view similar to that of FIG. 2, showing another embodiment of a stator vane trunnion support arrangement.

A further embodiment of the present invention is shown in FIG. 5. In that embodiment bushing 44 has an inner diameter that is larger than the outer diameter of lower trunnion 40, to accommodate an inner tubular sleeve 82. Bushing 44 can be constructed in the same manner as the bushings shown in FIGS. 3 and 4, to maintain intimate contact between the bushing and the carrier ring throughout the operating temperature range of the engine. Tubular sleeve 182 is a relatively thin structure that can be press-fit onto lower trunnion 40, and that allows for the selection of dissimilar bushing and sleeve materials and to enable the use of wear reduction treatments that can be applied to or incorporated within the sleeve in order to further minimize friction and resulting wear between the relatively rotating parts. Such wear reduction treatments can include, for example, polymeric wear materials and coatings, bonded carbon to TEFLON® (a fluorocarbon polymer) weave fabrics, a hard coating, or various other treatments such as heat treatment, nitriding, and the like. In addition to their use on or in connection with the tubular sleeve included as a part of the embodiment shown in FIG. 5, such wear reduction treatments can also be utilized on or applied to the stator vane trunnions or to the bushings in the embodiments shown in FIGS. 1 through 4.

It will be appreciated that the invention as hereinabove described and as illustrated in the accompanying drawings provides distinct advantages over the existing arrangements, and that it increases the lengths of the time periods within which carrier ring or bushing replacements must be made.

As used herein, the term "stator vane" is intended to include compressor stator vanes, turbine stator vanes, and other pivotable elements, such as engine inlet guide vanes, compressor and fan outlet guide vanes, as well as other rotatable or pivotable elements that are provided and in which materials having dissimilar coefficients of thermal expansion are utilized. And although the foregoing description has proceeded based upon the radially innermost trunnions of a variable-position stator vane, it will be appreciated that the present invention is equally applicable to the support structure for supporting the radially outermost trunnions of variable-position stator vanes.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A stator vane support structure for supporting a turbomachine stator vane for pivotal movement about a stator vane pivot axis, said support structure comprising:

a) a carrier member for supporting a trunnion that extends from a longitudinal end of a stator vane, the carrier member formed from a material having a first coefficient of thermal expansion and including an opening defined by an opening diameter;

b) a substantially cylindrical bushing carried in the opening in the carrier member for receiving the trunnion, the bushing including a tubular body wall within which the trunnion is received for relative rotation therewith, wherein the tubular body wall includes a longitudinally-extending gap to allow the outer diameter of the bushing to be decreased by the application of a laterally-applied compressive force, the tubular body wall when in a relaxed condition having an initial outer diameter that is larger than the diameter of the opening in the carrier member, so that upon lateral compression of the bushing to a smaller outer diameter than its initial outer diameter it can be inserted into the opening in the carrier member and can be retained therein by an interference fit upon release of the compressive force, wherein the bushing is formed from a material having a second coefficient of thermal expansion that is lower than the first coefficient of thermal expansion.

2. A stator vane support structure in accordance with claim 1, wherein the carrier member is an annular ring having a plurality of circumferentially-spaced, radially-extending openings to receive and pivotably support a plurality of stator vanes.

3. A stator vane support structure in accordance with claim 2, wherein the carrier member has an inner periphery and the inner periphery includes an annular recess having a predetermined axial width, wherein the radially-extending openings extend to the annular recess.

4. A stator vane support structure in accordance with claim 3 wherein the carrier member is formed from a material having a coefficient of thermal expansion in a range of from about $10 \times 10^{-6}$ in/in/° F. to about $14 \times 10^6$ in/in° F.

5. A stator vane support structure in accordance with claim 1, wherein the bushing includes a radially-outwardly-extending flange that has a longitudinal gap that is aligned with the gap in the tubular body wall.

6. A stator vane support structure in accordance with claim 5, wherein the flange includes a pair of diametrically-opposed surfaces to engage a pair of opposed surfaces of the carrier member to limit rotation of the bushing relative to the carrier member.

7. A stator vane support structure in accordance with claim 6, wherein the carrier member has a plurality of circumferentially-spaced, radially-extending openings and has an inner periphery that includes a circumferential recess having a predetermined axial width, the radially-extending openings extending to the circumferential recess, and wherein the distance between the opposed surfaces of the bushing corresponds substantially with the axial width of the circumferential recess, to minimize relative rotation between the bushing and the carrier member.

8. A stator vane support structure in accordance with claim 1, wherein the bushing has an initial outer diameter that is at least about 2% larger than the diameter of the opening in the carrier member.

9. A stator vane support structure in accordance with claim 1, wherein the bushing outer diameter is greater than the diameter of the opening in the carrier member when the carrier member is substantially at its normal operating temperature.

10. A stator vane support structure in accordance with claim 1, wherein the longitudinally-extending gap is parallel to the bushing longitudinal axis.

11. A stator vane support structure in accordance with claim 1, wherein the longitudinally-extending gap is inclined relative to the bushing longitudinal axis.

12. A stator vane support structure in accordance with claim 1, including a tubular sleeve carried by and surrounding the trunnion.

13. A stator vane support structure in accordance with claim 12, wherein the tubular sleeve is made from a metallic material.

14. A stator vane support structure in accordance with claim 13, wherein the tubular sleeve material has a coefficient of thermal expansion substantially the same as that of the trunnion.

15. A stator vane support structure in accordance with claim 13, wherein the tubular sleeve is retained by the trunnion by an interference fit.

16. A method for maintaining surface-to-surface contact between a tubular bushing and a carrier member having an opening for receiving the tubular bushing, said method comprising the steps of:

a) providing a tubular bushing having an initial outer diameter and including a generally longitudinally-extending gap having a predetermined gap width to allow the bushing initial diameter to be decreased upon application of a lateral compressive force, wherein the bushing is formed from a material having a first coefficient of thermal expansion;

b) providing a carrier member having an opening for receiving the tubular bushing, wherein the carrier opening has an inner diameter smaller than the initial outer diameter of the bushing, and wherein the carrier member is formed from a material having a second coefficient of thermal expansion that is lower than the first coefficient of thermal expansion;

c) selecting the bushing material, the bushing initial outer diameter, the bushing gap width, the carrier member material, and the carrier opening inner diameter to enable the bushing outer diameter to remain in surface-to-surface contact with the carrier opening inner diameter over a temperature range of about 700° F.;

d) compressing the bushing laterally to reduce its outer diameter to a diameter smaller than the inner diameter of the opening in the carrier member;

e) inserting the compressed bushing into the carrier member opening; and f) releasing the lateral compression applied to the bushing to allow it to expand to come into tight, surface-to-surface contact with the carrier member opening and to remain in surface-to-surface contact therewith over the about 700° F. temperature range.

17. A method in accordance with claim 16, wherein the longitudinally-extending gap is parallel to the bushing longitudinal axis.

18. A method in accordance with claim 16, wherein the longitudinally-extending gap is inclined relative to the bushing longitudinal axis.

19. A method in accordance with claim 16, wherein the bushing material is a steel alloy and the carrier member material is an aluminum alloy.

* * * * *